(12) United States Patent
Patil et al.

(10) Patent No.: US 11,893,320 B2
(45) Date of Patent: *Feb. 6, 2024

(54) METHOD FOR BACKSHELL COMPONENTS IN 3D ROUTING HARNESS AND FLATTENING ROUTE HARNESS

(71) Applicant: Dassault Systemes SolidWorks Corporation, Waltham, MA (US)

(72) Inventors: Satyajeet Patil, Maharashtra (IN); Rahul Jape, Maharashtra (IN); Nitin Shirkey, Pune (IN); Sameer Bondre, Pune (IN)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 211 days.

This patent is subject to a terminal disclaimer.

(21) Appl. No.: 17/530,140

(22) Filed: Nov. 18, 2021

(65) Prior Publication Data

US 2023/0153483 A1    May 18, 2023

(51) Int. Cl.
*G06F 30/18* (2020.01)
*B60R 16/02* (2006.01)
(Continued)

(52) U.S. Cl.
CPC .......... *G06F 30/18* (2020.01); *B60R 16/0207* (2013.01); *G06T 17/10* (2013.01); *G06F 2113/16* (2020.01)

(58) Field of Classification Search
CPC ....... G06T 17/10; G06F 30/18; G06F 2113/16
See application file for complete search history.

(56) References Cited

U.S. PATENT DOCUMENTS 7,558,705 B1 *  7/2009  Hughes .................. G06F 30/18
174/72 A
2002/0111778 A1    8/2002  Barrow
(Continued)

FOREIGN PATENT DOCUMENTS

EP    0967122    12/1999

OTHER PUBLICATIONS

Extended European Search Report for EP22208391.7 dated Apr. 12, 2023.
(Continued)

*Primary Examiner* — Terrell M Robinson
(74) *Attorney, Agent, or Firm* — Sheehan Phinney Bass & Green PA

(57) ABSTRACT

A three dimensional (3D) backshell component is flattened to a two dimensional (2D) representation while maintaining a connected wiring component in 3D. Sketch segments for a curved 3D backshell connected first route segment within the backshell housing are stored. A first tangent is computed for a first entry point at a first end point of the connected first route segment, and a flattened route is calculated for route segments unconnected to the backshell. A flattened route position and a second tangent are calculated for a second route segment connected with the first route segment at a second entry point corresponding to the first entry point. The first entry point and the second entry point are aligned, and the first tangent and the second tangent are aligned, and the flattened unconnected route segment aligned with the 3D backshell component is displayed.

11 Claims, 13 Drawing Sheets

(51) Int. Cl.
*G06T 17/10* (2006.01)
*G06F 113/16* (2020.01)

(56) References Cited

U.S. PATENT DOCUMENTS

| | | | |
|---|---|---|---|
| 2003/0050723 A1* | 3/2003 | Ozaki | G06F 30/18 700/117 |
| 2003/0126576 A1* | 7/2003 | Graham | G06F 30/00 716/126 |
| 2009/0222121 A1* | 9/2009 | Flores | G06T 19/00 700/118 |
| 2010/0070243 A1 | 3/2010 | Yvon | |
| 2017/0243361 A1 | 8/2017 | Schaffert | |
| 2019/0232894 A1* | 8/2019 | Holdsworth | G06F 30/18 |
| 2023/0134125 A1* | 5/2023 | Baltaxe | G06F 18/214 701/23 |

OTHER PUBLICATIONS

Dassault Systemes; "Generating Separate Routing Assemblies of Cables" Sep. 2021.

* cited by examiner (Multipin connector/component)

FIG. 7A
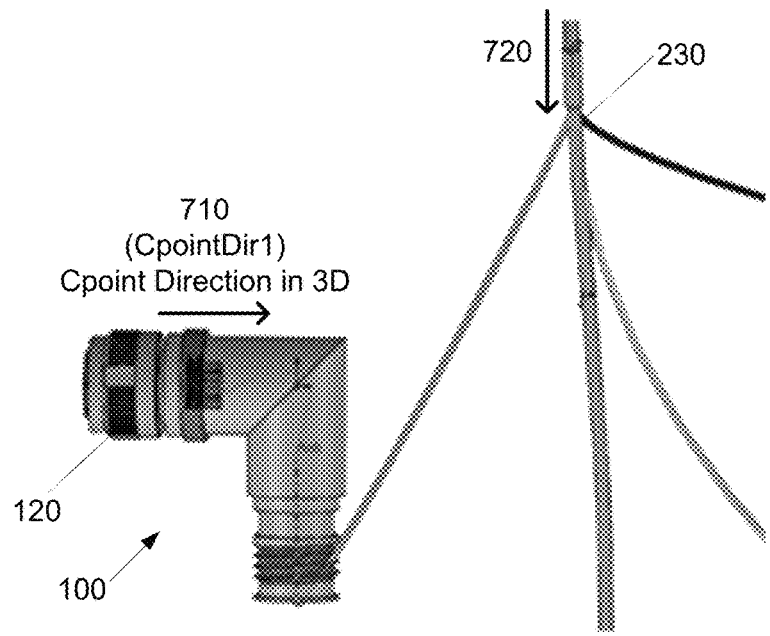
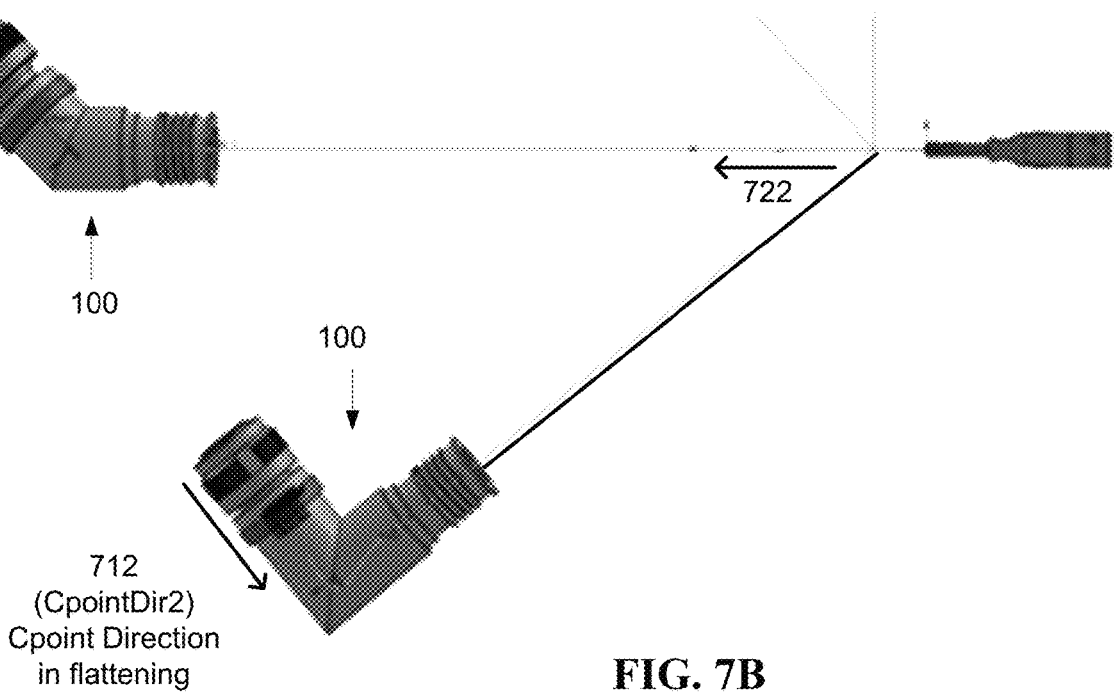
FIG. 7B

METHOD FOR BACKSHELL COMPONENTS IN 3D ROUTING HARNESS AND FLATTENING ROUTE HARNESS

FIELD OF THE INVENTION

The present invention relates to a computer aided drafting application, and more particularly, is related to representation of 3D models for manufacturing.

BACKGROUND OF THE INVENTION

Computer aided drafting (CAD) software, such as SOLIDWORKS, may employ a routing application that may be used to design an electrical harness. These harnesses are typically designed in 3D environment and are converted into 2D for presentation to a user, for example, as a paper printout. The 2D rendering of the 3D model of the electrical harness is called a flattened harness or a form-board design. Flattened or form-board designs are used for adding details such as connector tables, circuit summary, annotations, etc. For example, a flattened harness design may be used by manufacturers on a shop floor to manufacture the electrical harness.

All wires are flattened in existing solutions, including wires associated with connectors. However, in some cases a flattened drawing may show wires detached from their connectors. FIG. 1D shows a 3D representation of an exemplary backshell component 100, having a shell housing 110, a connector 120, external wiring segments 140, internal wiring segments 150 and a strain relief portion 160. Flattening of a backshell component 100 may be problematic, particularly for backshells having bending internal segments 150 for example causing internal wiring segments 150 routed through the backshell component 100 to misleadingly appear to intersect with backshell component 100. Therefore, there is a need in the industry to address the above-mentioned shortcomings.

SUMMARY OF THE INVENTION

Embodiments of the present invention provide a method for backshell components in a 3D routing harness and flattening route harness. Briefly described, the present invention is directed to a method for flattening a three dimensional (3D) backshell component as a two dimensional (2D) representation while maintaining a connected wiring component in 3D. Sketch segments for a curved 3D backshell connected first route segment within the backshell housing are stored. A first tangent is computed for a first entry point at a first end point of the connected first route segment, and a flattened route is calculated for route segments unconnected to the backshell. A flattened route position and a second tangent are calculated for a second route segment connected with the first route segment at a second entry point corresponding to the first entry point. The first entry point and the second entry point are aligned, and the first tangent and the second tangent are aligned, and the flattened unconnected route segment aligned with the 3D backshell component is displayed.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

FIG. 7A is a schematic diagram depicting 3D directions and coordinates for a transformation to make the backshell component parallel to a flattened viewing plane.

FIG. 7B is a schematic diagram depicting 2D directions and coordinates for a transformation of FIG. 7A.

DETAILED DESCRIPTION

Figure 1A:
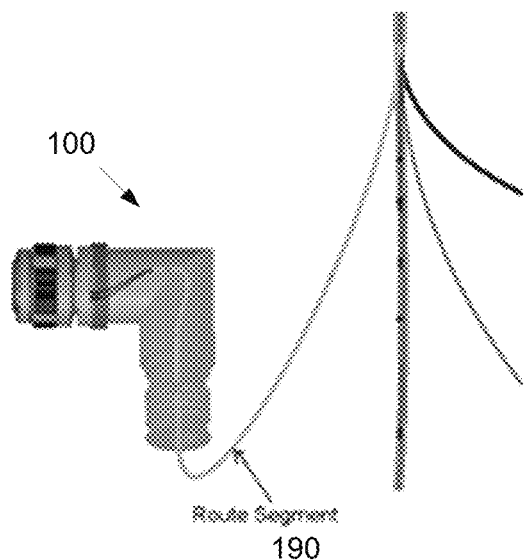
FIG. 1A is a schematic diagram of an exemplary whole route segment.

The following definitions are useful for interpreting terms applied to features of the embodiments disclosed herein, and are meant only to define elements within the disclosure.

This disclosure is directed to manipulation of a computer modeled object. Herein, references to manipulating an object generally will refer to manipulating, via a user interface, an image of the modeled object on a display screen. Examples of such manipulation of the modeled object include selecting, rotating, scaling, etc. It is understood that manipulations of the displayed modeled object results in manipulation by computer software of data objects representing aspects and topological features of the modeled object.

As used within this disclosure, in general, the phrase "computer-aided design" (CAD) refers to the use of computers (or workstations) to aid in the creation, modification, analysis, or optimization of a design. A "design" refers to a plan or specification (e.g., drawing), typically stored in computer-based memory, for an object or system, including construction details for that object or system. The SolidWorks® computer program, available from Dassault Systémes SolidWorks Corporation, the applicant of the current application, is one example of a computer-aided design software program. As used herein, the phrase "computer-aided design" should be construed broadly to include any computer software, device, or system that incorporates or can incorporate electrical harness design flattening capabilities.

As used within this disclosure, "XY-plane" refers to a reference plane parallel to a two dimensional representation of a model.

As used within this disclosure, a "component list" refers to a listing of individual parts of a two dimensional (2D) or three dimensional (3D) modeled assembly. In a CAD environment, a component list may be presented visually as a side-bar to a graphical window presenting a 2D or 3D rendering of the modeled assembly. The component list and the graphical window may be interactive, for example, selecting a component in the component list may highlight the corresponding component in the graphical window, and likewise selecting a component in the graphical window (for example, via a mouse click) may highlight the corresponding component in the component list.

As used within this disclosure, an "electrical harness" or "harness" (also known as a cable harness, a wire harness, wiring harness, cable assembly, wiring assembly or wiring loom) is an assembly of electrical cables or wires which transmit signals or electrical power. Typically, the cables are bound together by a durable material such as rubber, vinyl, electrical tape, conduit, a weave of extruded string, or a combination thereof. The electrical harness may include one or more terminating connectors to provide electrical connections to system components. Flattening of an electrical harness is described in a U.S. Patent application entitled "Method for Maintaining 3D Orientation of Route Segments and Components in Route Harness Flattening," which is incorporated by reference herein in its entirety.

Figure 1B:
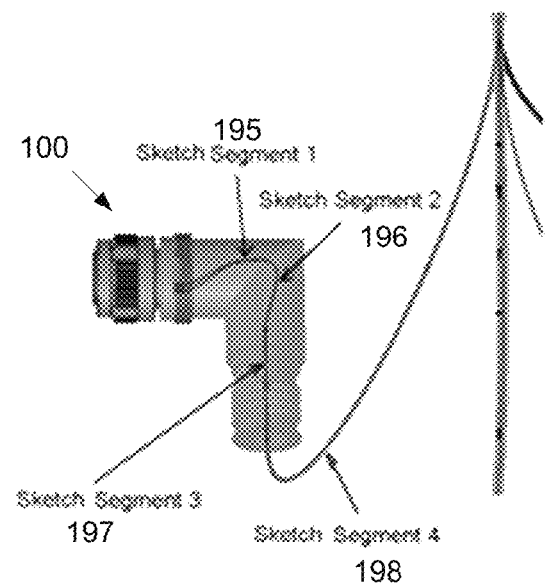
FIG. 1B is a schematic diagram showing the sketch segments present inside the route segment of FIG. 1A.

As used within this disclosure, a "route segment" is a portion of an electrical harness design in a computer-aided design environment. Typically, a route segment 190 (FIG. 1A) includes one or more sketch segments 195-198 (FIG. 1B) that extend between two junction points 130, 131 (FIG. 1C), between two connectors, or between a junction point and a connector 120 (FIG. 1D). Also typically, a route segment 190 has one or more route properties, stored in computer-based memory, which define one or more characteristics of the route segment 190, such as diameter, color, wires passing through it, etc. FIG. 1A shows whole route segment 190 whereas FIG. 1B shows the sketch segments 195-198 present inside that route segment 190.

As used within the disclosure, a connected route is a route segment directly connected to a selected component. Conversely, an "unconnected route" is a route segment not directly connected to a selected component, but an unconnected route may be directly connected to a connected route.

As used within this disclosure, a "backshell" refers to an individual component used to protect wires from mechanical injury. A backshell has mate references for mating with the end connectors. A backshell typically has at least one bend in an internal route segment (see FIG. 1D). A backshell may provide accommodations between an electrical cable clamping device and an electrical connector shell, or it may include the clamping device. The backshell may be used for shielding wires against electrical interference, mechanical injury, or physical damage due to environmental conditions. In Routing, Backshell components may be created or defined by using just one axis. In electrical harness design, backshell components may be identified by its component type which is defined as "backshell".

Figure 1C:
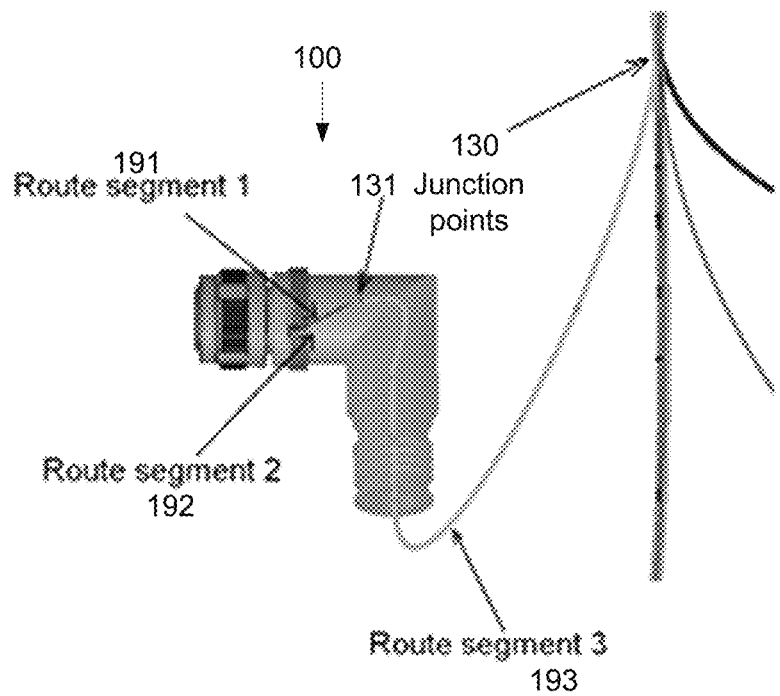
FIG. 1C is a schematic diagram showing exemplary route segments and route segment junction points.
Figure 1D:
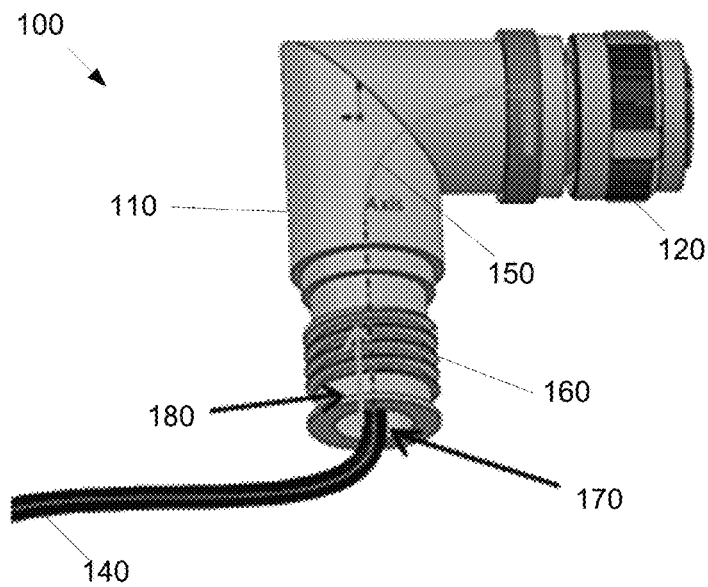
FIG. 1D is a drawing of a 3D representation of an exemplary backshell component.

As used within this disclosure, a "junction point" is a point on an electrical harness design in a computer-aided design environment where more than one route segments merge, as shown by junction points 130, 131 in FIG. 1C.

Figure 1E:
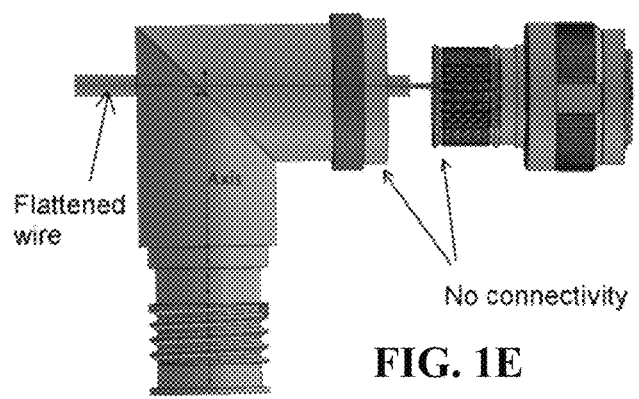
FIG. 1E shows an example of a prior art flattened backshell harness.
Figure 1F:
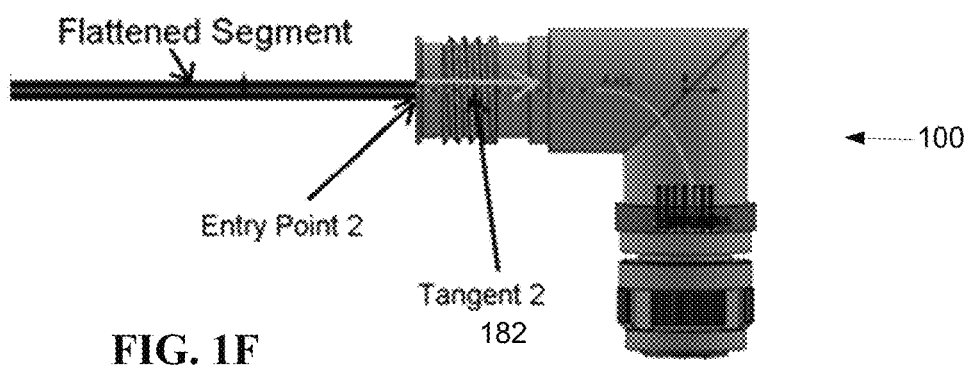
FIG. 1F shows an example of the backshell harness of FIG. 1E flattened under the present embodiments.
Figure 1G:
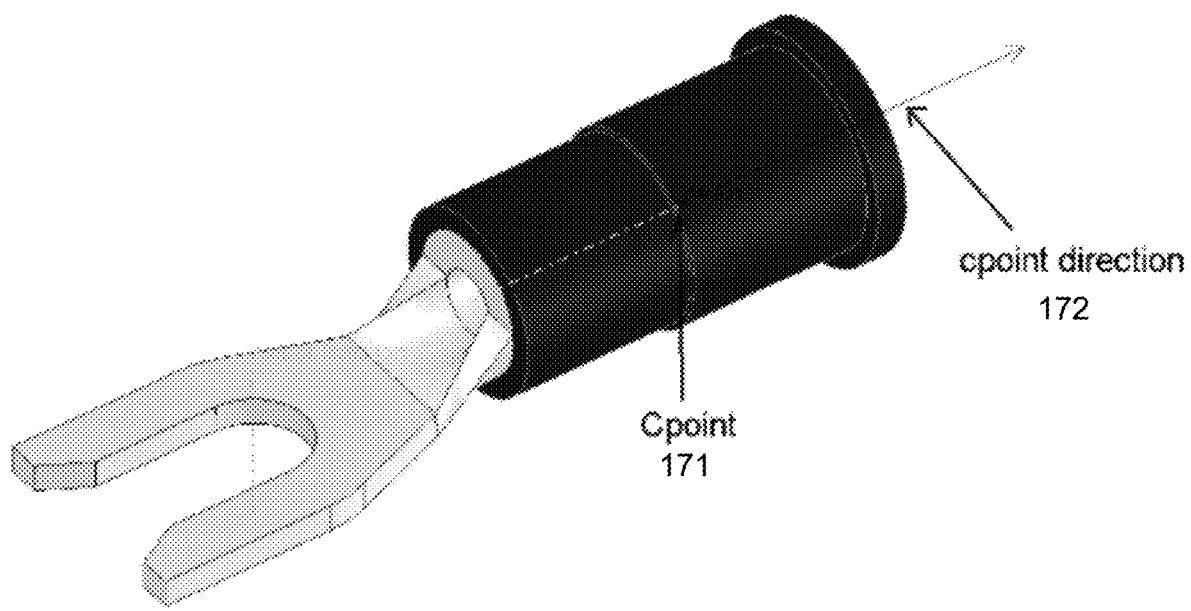
FIG. 1G is a schematic diagram of a connector illustrating a connection point and a connection point direction.

As used within this disclosure, a "connection point" or "CPoint" is a point on an electrical harness design in a computer-aided design environment where a route segment begins or ends, as shown in FIG. 1G. Typically, every connection point 171 has a direction, referred to as a "CPoint direction" 172, stored in computer-based memory, which identifies a direction in which the associated route segment extends. Typically, connection points or CPoint directions also have routing properties, such as diameter of the route segment and route type (e.g., electrical, piping, tubing) also stored in computer-based memory.

As used within this disclosure, the phrase "flattening" refers to a process by which a three-dimensional (3D) representation of a design (for example, a CAD rendering of a modeled object), or portion thereof, is converted into a two-dimensional (2D) representation in a computer-aided design environment. Specifically, flattening an electrical harness may be thought of as placing the entire electrical harness on XY plane and stretching each route segment (Wire/Cable) such that their lengths and connections are maintained as per the 3D Design. Any flattened harness output may be used further to create a flattened drawing (also called a formboard drawing) which typically is a document used to convey essential information like the wires used, the wire connections, the wire paths, etc. A flattened/formboard drawing conveys information that helps in manufacturing the actual electrical harness. FIG. 1D is a schematic diagram of an exemplary 3D backshell harness, while FIG. IF is a schematic diagram of a flattened backshell harness on an XY plane.

As used within this disclosure, the phrase "branch" refers to one or more electrical cables or wires in an electrical harness that extend from an electrical harness. Typically, a branch terminates at an electrical connector or connection point on an electrical component.

As used within this disclosure, the phrase "processor" or the like refers to any one or more computer-based processing devices. A computer-based processing device is a physical component that can perform computer functionalities by executing computer-readable instructions stored in memory.

As used within this disclosure, the phrase "memory" or the like refers to any one or more computer-based memory devices. A computer-based memory device is a physical component that can store computer-readable instructions that, when executed by a processor, results in the processor performing associated computer functionalities.

Reference will now be made in detail to embodiments of the present invention, examples of which are illustrated in the accompanying drawings. Wherever possible, the same reference numbers are used in the drawings and the description to refer to the same or like parts.

Exemplary embodiments of the present invention are directed to flattening a 3D backshell connector. Under the embodiments, 3D wires inside the backshell connector are not flattened because the flattening process may cause wires may intersect the backshell component. The appearance of connectivity is maintained between flattened harness on XY plane/form board and segments within the backshell. The embodiments also address issues with connector orientation often encountered during backshell flattening. FIG. 1E shows an example of a backshell harness flattened without the present embodiments, while FIG. 1F shows an example of the same backshell harness flattened under the present embodiments.

In general, and as discussed further below in more detail, the under the embodiments the route segments are detected and the sketch segments inside the backshell component are identified. Data for the identified sketch segments are stored. The relationships between stored sketch segment data and flattened data for other segments associated with the stored sketch segments are processed to maintain tangency after flattening. Sketches are created from the processed data and used depict the connectors at appropriate location in the flattened image.

In existing applications, a flattening algorithm flattens all the wires of any electrical harness without maintaining bends of wires, such that the 2D representation presents the wires in the form of fan-outs with respect to connector. Under the embodiments described herein, users may maintain the 3D orientation for any route segment for a connector within the flattened backshell component.

Figure 6A:
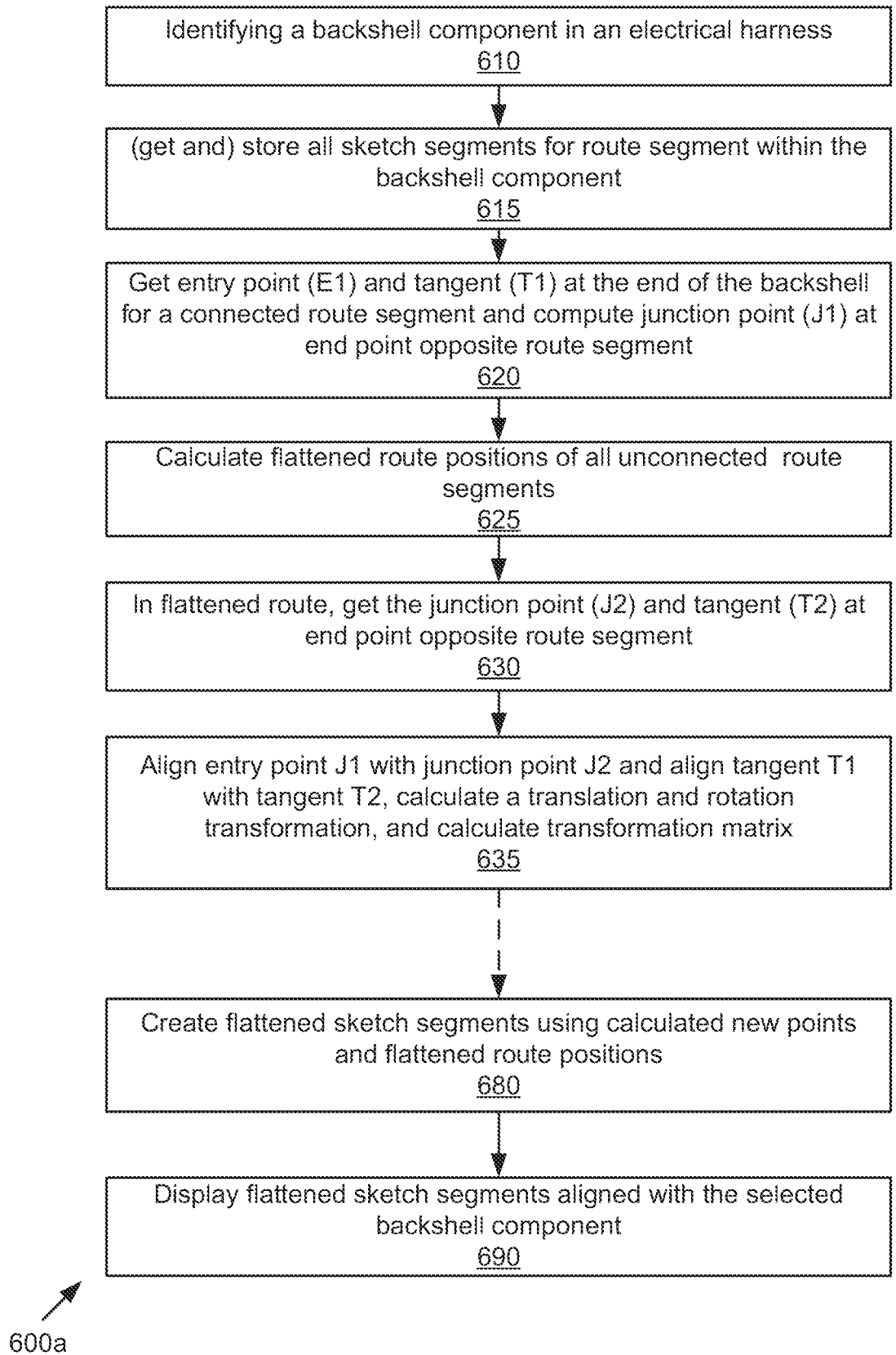
FIG. 6A is a first flow chart of a first exemplary method embodiment for an application in a computer aided drafting environment for flattening a three dimensional modeled backshell to a two dimensional representation.
Figure 6B:
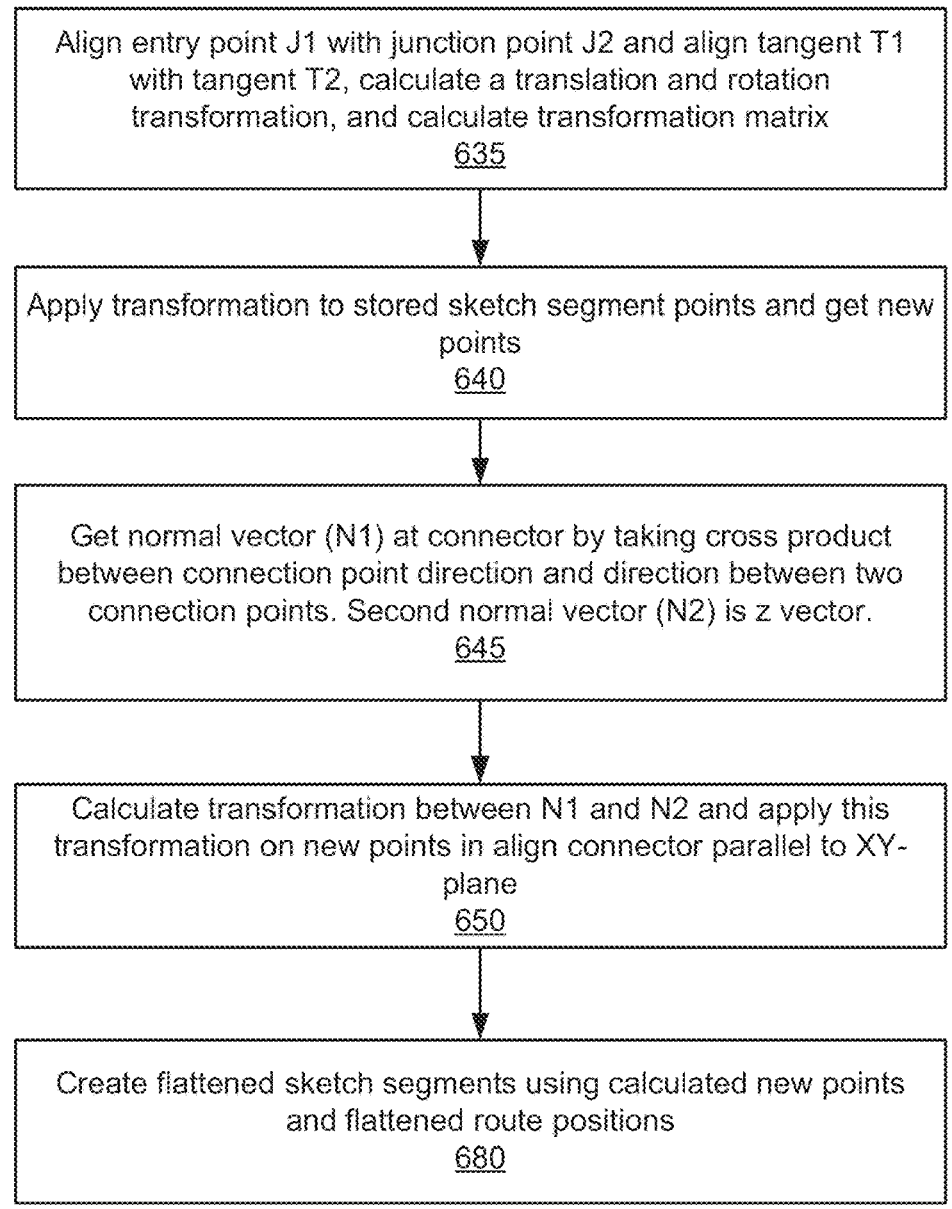
FIG. 6B is a second flow chart supplementing the method for FIG. 6A for a multipin connector/component.

FIGS. 6A and 6B are flowchart 600a, 600b for an exemplary first embodiment of a computer based method for an application in a computer aided drafting (CAD) environment for flattening a three dimensional (3D) modeled backshell component to a two dimensional (2D) representation. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A backshell is identified in an electrical harness model as shown by block 610, for example by the electrical harness model component type. The backshell component is mated to a 3D connector. From the 3D connector, the connected route segments within the backshell components are identified. The connected route segment includes at least one sketch segment. All sketch segments for the connected route segments are stored in memory, as shown by block 615.

A first at Entry Point (E1) at a connected route segment and a first junction point (J1) at a connected first route segment other end point are identified. A first tangent (T1) at the first entry point is computed. Using the first Tangent (T1) at the first entry point, a new junction point is computed at required length of route segment, as shown by block 620. This new computed junction point (J1) is used for further calculations, as shown by FIG. 2D.

A flattened route is calculated for all route segments unconnected to the backshell component as shown in block 625. A second junction point (J2) is identified in the flattened route. A second tangent (T2) is computed at the second junction point (J2), as shown by block 630.

A translation and rotation transformation is calculated aligning the first junction point to the second junction point, and aligning the first tangent and the second tangent, as shown by 635, and a transformation matrix is calculated based on the translation and rotation transformation. Flattened sketch points are created using the transformed sketch segment points and the flattened route positions as shown by block 680. The flattened unconnected route segment is displayed aligned with the backshell component, as shown by block 690.

FIG. 6B shows additional implementation of the method shown in FIG. 6A for a connector in a backshell component. A transformation is applied to the stored sketch segment points to calculate transformed sketch segment points, as shown by block 640. A first normal vector (N1) is calculated at the connector by taking a cross product between a connection point first direction and a second direction between two connection points, as shown by block 645, where the second normal vector (N2) is parallel to the Z axis. As shown by block 650, an N1/N2 transformation is calculated between the first normal vector N1 and the second normal vector N2. The N1/N2 transformation is applied on the transformed sketch segment points aligning the connector parallel to an XY-plane. Flattened sketch points are created using the transformed sketch segment points and the flattened route positions as shown by block 680.

Figure 2A:
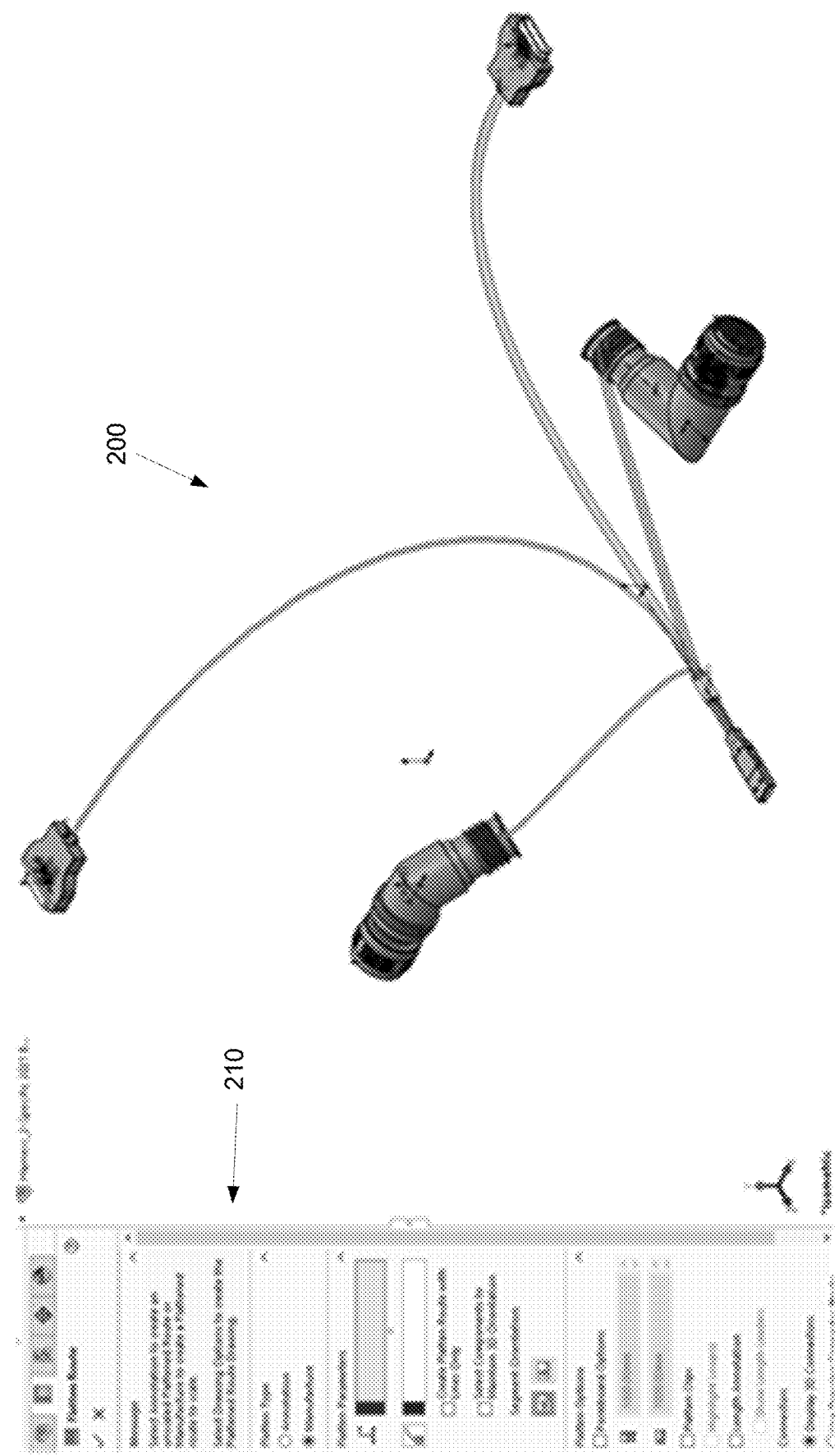
FIG. 2A is a schematic drawing of a CAD represented 3D model of a wiring harness as a workpiece for a first exemplary embodiment of a flattening method for a backshell connector.
Figure 2B:
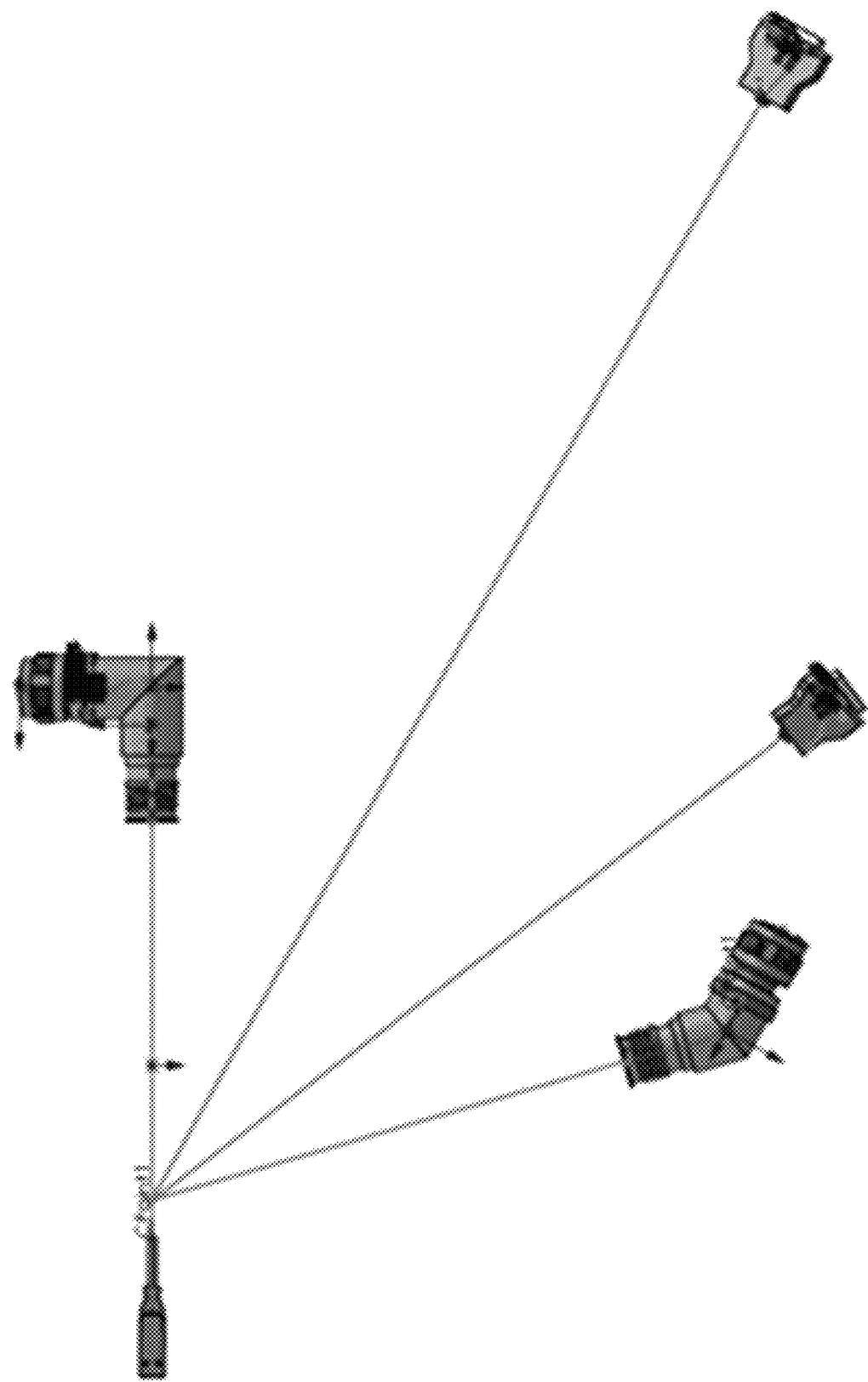
FIG. 2B is a schematic drawing of the wiring harness of FIG. 2A after applying the first exemplary embodiment of a flattening method while maintaining 3D connectors.
Figure 2D:
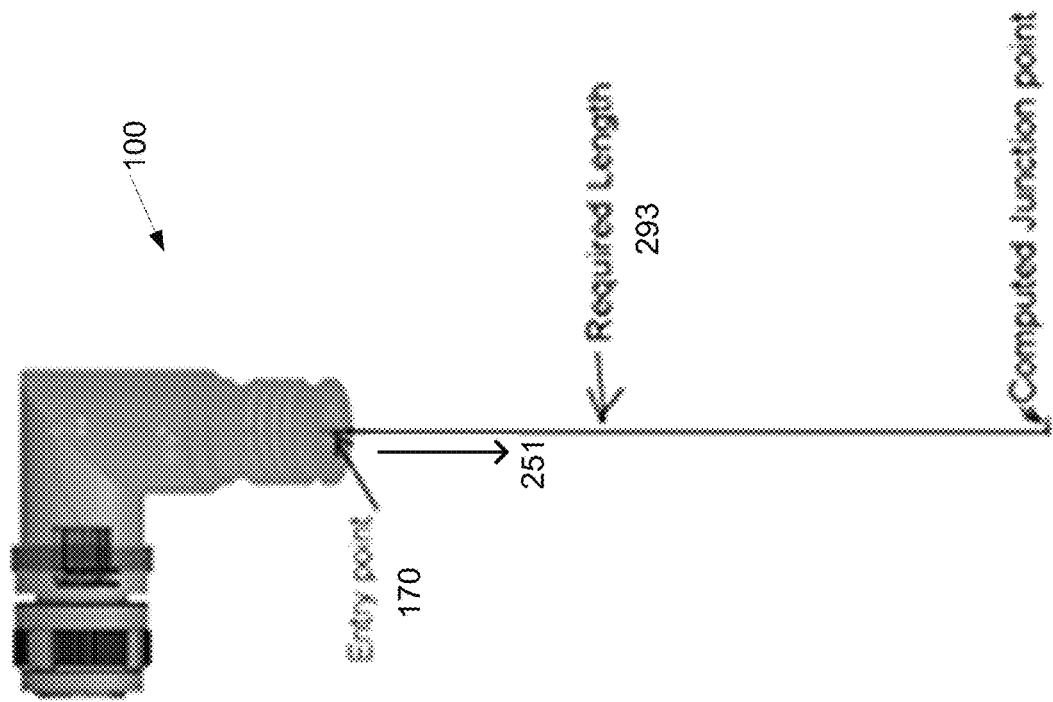
FIG. 2D is a schematic drawing of required length of a route segment in flattening.

In an exemplary workflow, the CAD environment presents a 3D representation of components in electrical harness design 200 and a flattened route property page 210 for example when a user selects a flattened type "Manufacture," as shown in FIG. 2A. The application implementing the embodiments (described below) identifies and separately stores the backshell components mated with 3D connectors. Upon user initiation, for example, by making the appropriate selection in the window 210, the application identifies and processes the backshell components separately to maintain the 3D orientation of route segments inside each backshell component and flattens the route segment outside the backshell component. The output of flattening of the above example is shown in FIG. 2B.

According to the embodiments, an application, for example hosted by the CAD environment, identifies a 3D 120 connector (FIG. 1D) mated to a backshell component 100. For example, component data stored by the CAD environment may identify backshells along with their component types. If the backshell component 100 is mated with a 3D connector 120, the backshell component 100 is stored and used to identify 3D connector 120. When the 3D connector 120 is used by the CAD application, the application identifies associated connected route segments.

Once the backshell component 100 has been identified, route segments 191-193 are identified that are inside the backshell component 100 or that pass through the backshell component 100. A route segment 190 is made of single or multiple sketch segments 195-198. FIG. 1A shows whole route segment 190 whereas FIG. 1B shows the sketch segments 195-198 present inside that route segment. In the example shown by FIG. 1C, three route segments 191-193 pass through the backshell component 100. These three route segments 191-193 are stored, for example in an array entitled routeNotToFlatten. This array accounts for all route segments either inside or passing through backshell components.

A second store keeps information of sketch segments inside the backshell components against its own route segment. A map Partially3DOrientedSegment stores the array of sketch segments inside the backshell component against route segment, as shown by FIG. 1B.

The backshell components may be handled differently depending upon their configuration. In a first scenario, shown by FIG. 3A the backshell component 100 is mated with a multi-CPoint connector 310. These route segments created at multiple CPoints merge at a junction point 320. The connected sketch segments 330, which start from the junction point 320 and end at the backshell end 340 are referred to as "sketch segments inside the backshell component." In the harness data, the sketch segments 330 inside the backshell component 100 are stored in relation with the harness route segment.

Figure 3A:
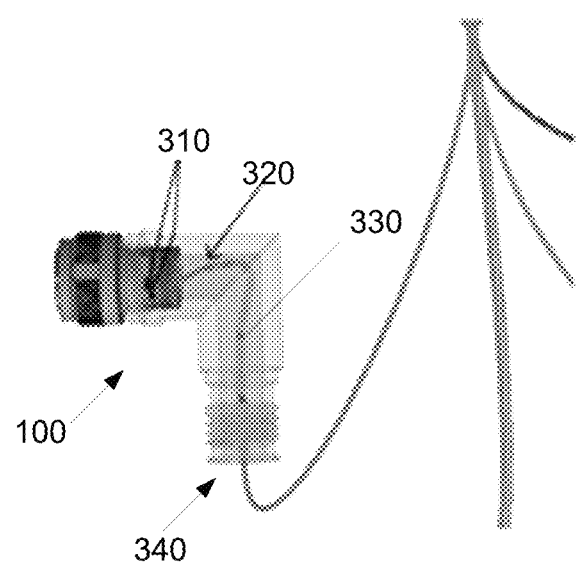
FIG. 3A is a schematic diagram of an exemplary backshell component mated with a multi-CPoint connector rendered in 3D.
Figure 3B:
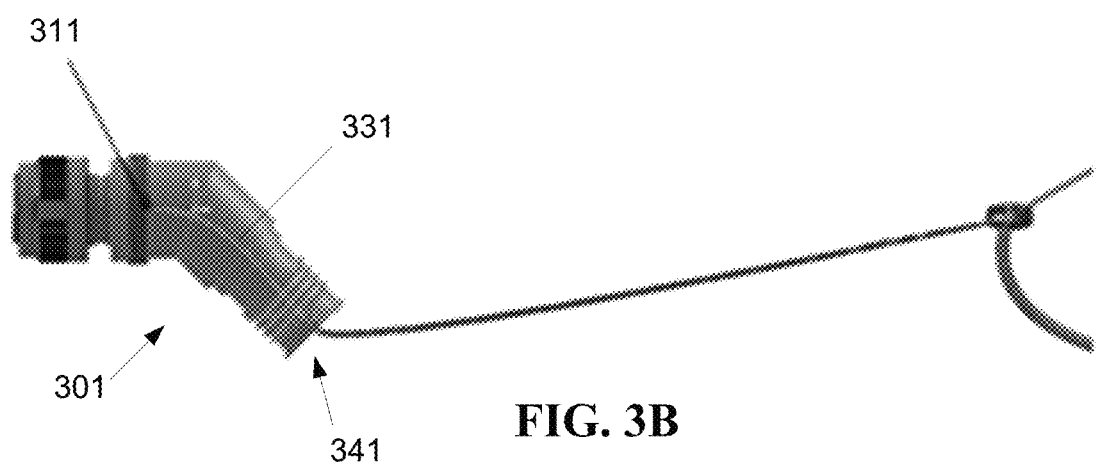
FIG. 3B is a schematic diagram of an exemplary backshell component mated with a single CPoint connector rendered in 3D.

In a second scenario, shown in FIG. 3B, a backshell component 301 is mated with single CPoint connector 311. The connected sketch segments 331, which starting from the single CPoint 311 and end at the backshell end 341 are considered as Sketch segments inside backshell component 311. In FIG. 3A the sketch segments 330 starts from the junction point 320 whereas in FIG. 3B the sketch segments 331 start from the CPoint 311.

Figure 3C:
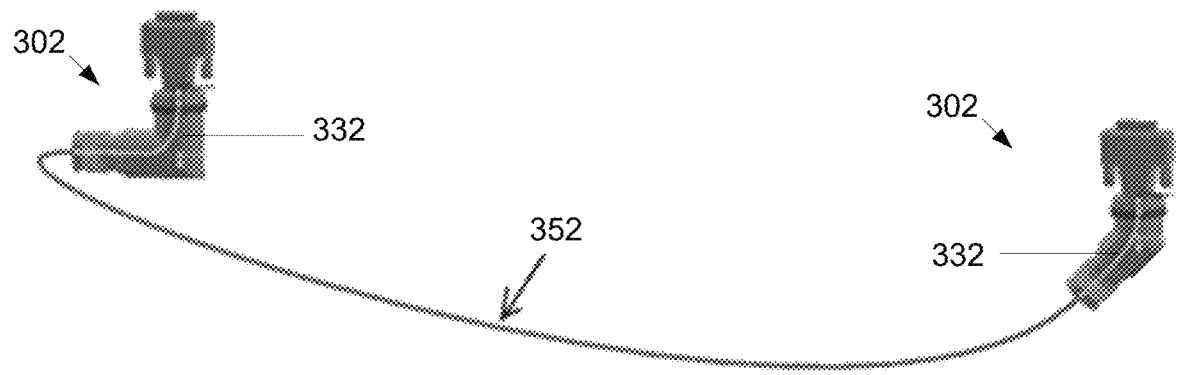
FIG. 3C is a schematic diagram of two exemplary backshell components are attached at each end of one route segment.

In a third scenario, shown in FIG. 3C, two-backshell components 302 are attached at each end of one route segment 352. The connected sketch segments 332, each starting from a single CPoint and end at the backshell 302 are considered as sketch segments 332 inside their respective backshell component 302. In this case, the application creates two arrays of sketch segments 302 against one route segment 352.

The application computes the entry point and tangent in the backshell component 3D model. FIG. 1D shows the backshell component 100 in the 3D model. In order to align the sketch segment inside the backshell component 100 and the flattened segment, the application first computes the entry point 170 to the backshell 100 and a respective tangent 180 in the 3D Model. The entry point 170 is a common point between sketch segments inside the backshell 100 and remaining sketch segments outside the backshell component 100 of same route segment 140. The tangent 180 is calculated at the entry point 170 for segment just outside the backshell component 100. The 3D tangent is stored as Tangent1, and the 3D entry point data is stored as EntryPoint1.

The application computes the entry point and tangent for the flattened backshell component. A 3D model to flattening point map is generated during the existing flattening process. The 3D model to flattening point map is used to get the value of flattened entry point, as shown in FIG. 1F. As with the 3D model, the application calculates tangent at entry points for flattened segment, and stores them as Tangent2 and EntryPoint2 respectively.

The junction point 231 shown in FIG. 2D for the 3D backshell is computed using a "required length" 293 of the route segment, including the total length of sketch segments outside Backshell that are part of same route segment. The junction point is calculated as:

JunctionPoint (J1) 231=Entry point 170+(Normalized Tangent 251×Required Length 293)

Figure 2C:
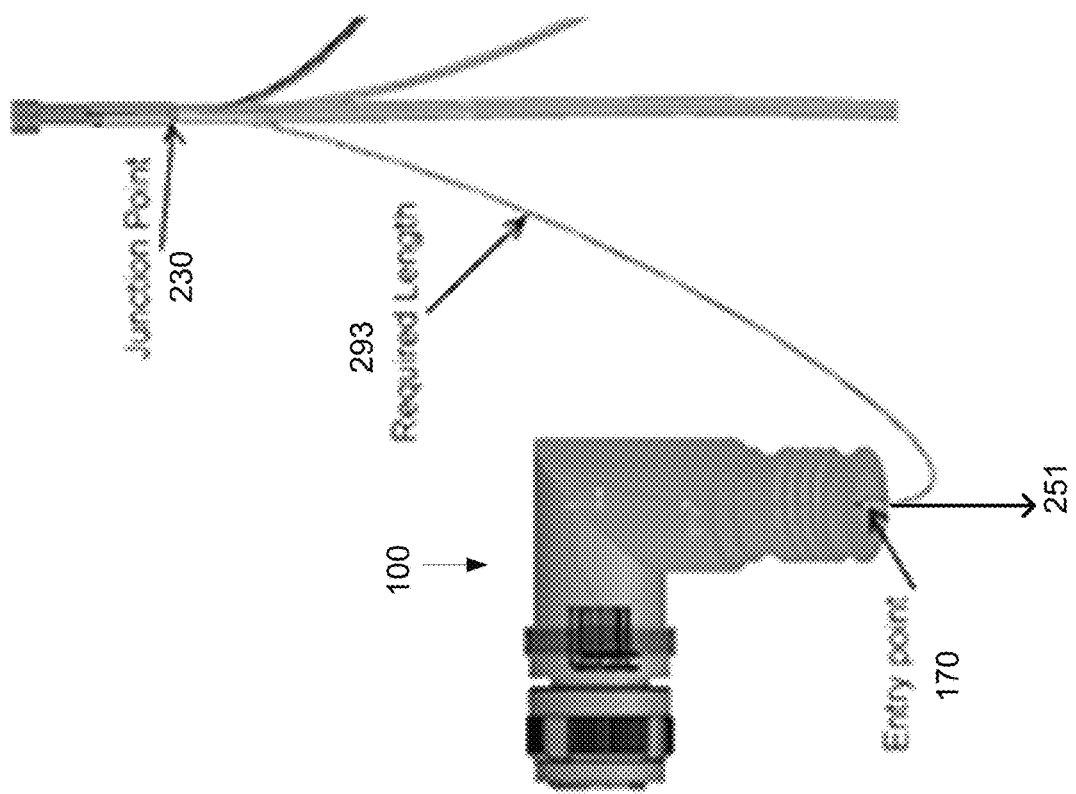
FIG. 2C is a schematic drawing of required length of a route segment in 3D model.

FIG. 2C shows the actual 3D model with the junction point 230 whereas FIG. 2D shows the computed junction point 231.

A FlattenedPointTo3DPoint map is created from flattened route segments (excluding route segments marked as not to be flattened), using existing route flattening techniques. An exemplary flattened segment is shown in FIG. 1F. The FlattenedPointTo3DPoint map is used to obtain the value of the flattened junction point ("Junction Point 2"), stored as Junction2 data. As with the 3D model, a tangent is calculated at Junction Point2 for the flattened segment and stored as Tangent2 data.

Regarding the transformation matrix in the flowchart shown in FIG. 6B, under the first embodiment the transformation calculation may be implemented in three steps. First two steps are to align the 3D tangent 180 (FIG. 1D) to the Y-axis and last step is to align the Y-axis to the 2D tangent 182 (FIG. 1F). The 2D tangent 182 direction and the 3D tangent direction 180 are normalized.

For the rotation transform about Z-axis for the 3D tangent 180 (zAxisRotationMatrix), the 3D tangent 180 (Tangent1) vector is projected on the XY-plane, which amounts to setting the Z value as zero. The normalization is performed again for the new direction, namely the 3D Tangent 180 on the XY-plane (Tangent1onXYplane). If the normalized 3D tangent 180 results in zero X and Y values, an identity matrix is created around Z-axis at the second (2D) junction point 230 (FIG. 7C) (i.e., zAxisRotationMatrix), or alternatively, a rotation matrix is calculated between the Y-axis and Tangent1 on the XY-plane around the Z-axis i.e., zAxisRotationMatrix.

Figure 4A:
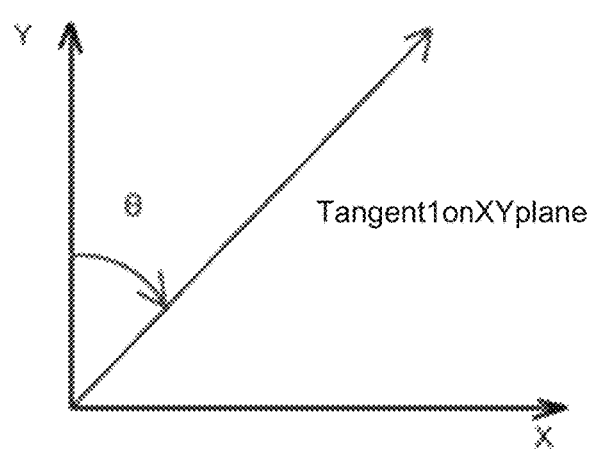
FIG. 4A is a plot showing a first angle of a 3D junction point tangent in the XY plane.
Figure 4B:
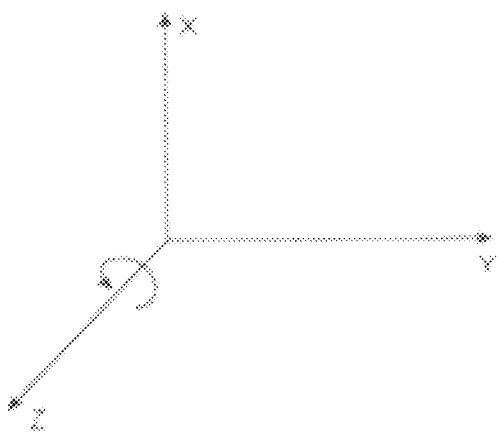
FIG. 4B is a plot indicating rotation around the Z-axis with respect to the XY plane.

Calculating zAxisRotationMatrix involves calculating an angle (Theta: θ) between the Y-axis and Tangent1onXYplane, as shown by FIG. 4A. To align Tangent1onXYplane to the Y-axis, a rotation matrix about the Z-axis is calculated, as shown by FIG. 4B.

Theta angle is used to calculate rotation matrix, here named zAxisRotationMatrix.

$$\begin{bmatrix} x' \\ y' \\ z' \\ w \end{bmatrix} = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix} \begin{bmatrix} x \\ y \\ z \\ w \end{bmatrix} \quad \text{(Eq. 1)}$$

Rotation Transform about X-axis for Tangent1: "xAxisRotationMatrix"

Tangent1 vector is translated onto the YZ plane, by setting the X coordinate value as zero. Normalization is performed for these new directions (Tangent1onYZplane). If Tangent1onYZplane's Y and Z values are zero, then an Identity matrix is created around X-axis at junction2 (i.e., xAxisRotationMatrix) else need to calculate rotation matrix between Y-axis and Tangent1onYZplane around X-axis i.e., xAxisRotationMatrix.

Figure 4C:
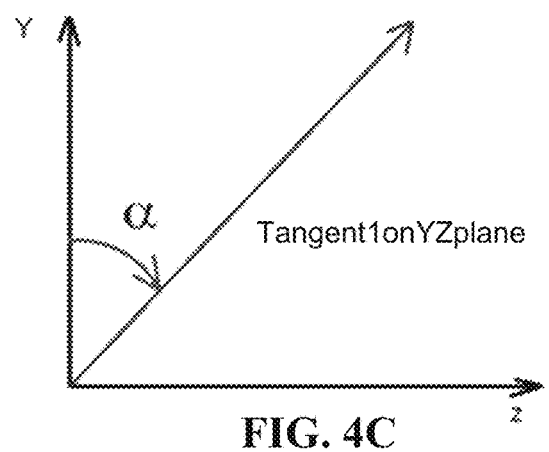
FIG. 4C is a plot showing a second angle of the 3D junction point tangent in the YZ plane.
Figure 4D:
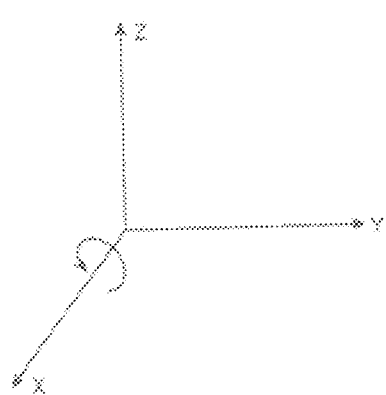
FIG. 4D is a plot indicating rotation around the X-axis with respect to the YZ plane.

Calculating xAxisRotationMatrix includes calculating an angle (Alpha: α) between Y-axis and Tangent1onYZplane, as shown in FIG. 4C. A rotation matrix is calculated about the X-axis to align Tangent1onYZplane to the Y-axis, as shown by FIG. 4D. The alpha angle is used to calculate a rotation matrix xAxisRotationMatrix.

$$\begin{bmatrix} x' \\ y' \\ z' \\ w \end{bmatrix} = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \begin{bmatrix} x \\ y \\ z \\ w \end{bmatrix} \quad \text{(Eq. 2)}$$

Rotation Transform about Z-axis for Tangent2: "zAxis2DRotationMatrix"

Tangent2 vector are projected on the XY plane (i.e., setting Z value as zero). Here again normalization is performed for the new direction (Tangent2onXYplane).

If the X and Y values of Tangent2onXYplane are zero, an Identity matrix is created around the Z-axis at junction2 (i.e., zAxis2DRotationMatrix). Otherwise, a rotation matrix is calculated between the Y-axis and Tangent2onXYplane around Z-axis i.e., zAxis2DRotationMatrix.

Figure 4E:
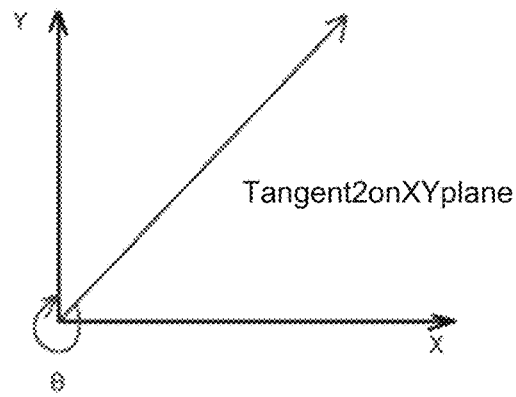
FIG. 4E is a plot showing a first angle of a 2D junction point tangent in the XY plane.

An angle (Theta: θ) is calculated between the Y-axis and Tangent2onXYplane for zAxis2DrotationMatrix, shown by FIG. 4E. The rotation matrix is calculated about the Z-axis to align Tangent2onXYplane to Y-axis, as shown by FIG. 4B. The angle theta is used calculate a rotation matrix zAxisRotation2DMatrix.

$$\begin{bmatrix} x' \\ y' \\ z' \\ w \end{bmatrix} = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix} \begin{bmatrix} x \\ y \\ z \\ w \end{bmatrix} \quad \text{(Eq. 3)}$$

The three rotation transforms derived above (zAxisRotationMatrix, xAxisRotationMatrix, zAxis2DrotationMatrix are multiplied to provide the Rotation "RotationMatrix3Dto2D"

A matrix for translating between Junction1 and Junction2 is derived as follows. A difference between Junction1 and Junction2 is calculated. For example, this difference point may be referred to as T having coordinates are Tx, Ty and Tz. With the use of difference, the translation matrix "TranslationMatrix" is calculated:

$$\begin{bmatrix} 1 & 0 & 0 & Tx \\ 0 & 1 & 0 & Ty \\ 0 & 0 & 1 & Tz \end{bmatrix} \quad \text{(Eq. 4)}$$

The application in the CAD environment calculates a transformation to make the backshell component 100 parallel to a flattened viewing plane (front plane). First, in order to make the backshell component 100 parallel to the flattened view front plane, the application determines a connection point (CPoint) direction in 3D based on a first CPoint direction (CPointDir1) ointDir1) 710 for the internal connector 120 CPoint, and a Tangent 720 for the 3D junction as shown by FIG. 7A.

Second, the application computes a CPoint direction for the flattening ("CPointDir2"). The application multiplies the CPointDir1 direction with the RotationMatrix3Dto2D to provide CPoint direction in flattening. FIG. 7B shows CPoint direction (CPointDir2) in flattening.

Third, the application calculates a cross product (Cross Vector) between CPointDir2 712 and Tangent 722. If Cross Vector is parallel to the Z-axis the backshell component is already parallel to the viewing plane, so the identity matrix is used for a viewing direction transformation. If Cross Vector is not parallel to the Z-axis, the application calculates a viewing direction transformation (viewingMatrix). Fourth, the application computes the viewing direction transformation, by calculating an angle (Angle 1) between Cross Vector and the Z-axis about Tangent 722, and then calculating the rotation matrix (viewingMatrix) about Tangent 722 using Angle1. Fifth, the application calculates a combined rotation matrix (RotationMatrix) by multiplying viewingMatrix with RotationMatrix3Dto2D.

Figure 7C:
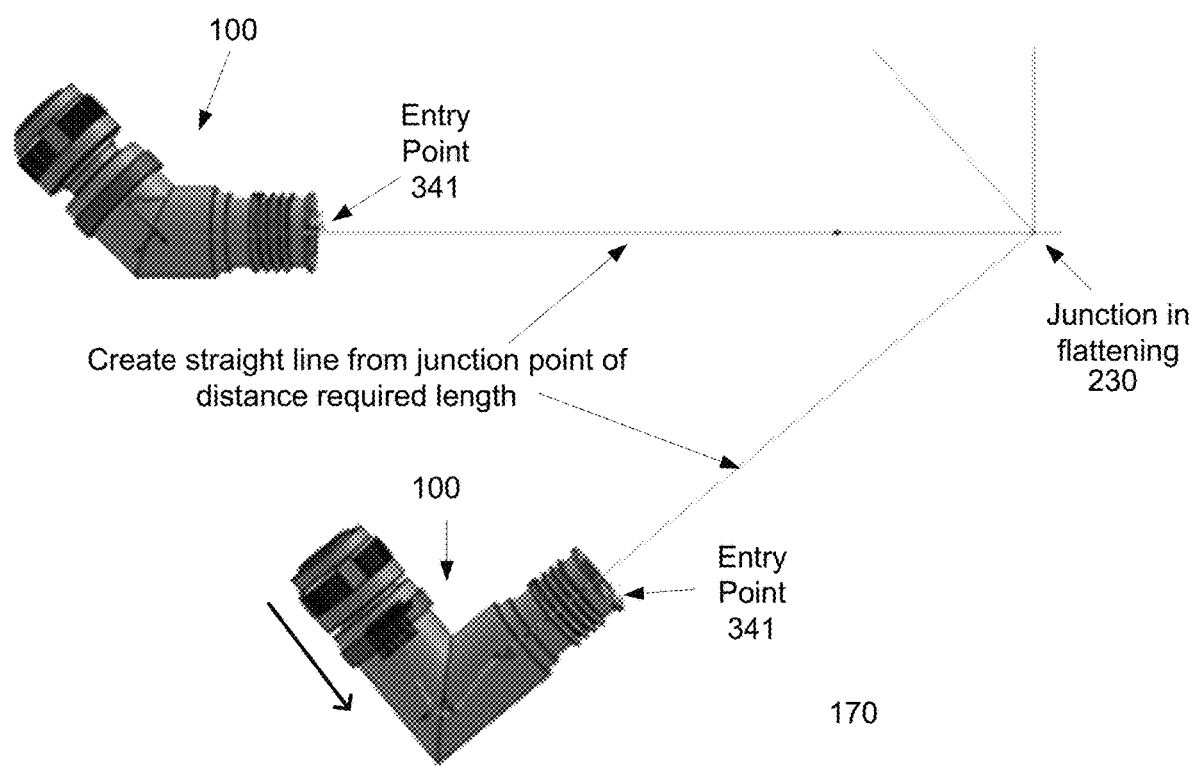
FIG. 7C is a schematic diagram depicting flattened sketch segments resulting from the transformation of FIG. 7A.

The process described above results in the RotationMatrix and TranslationMatrix. From the junction point 230, the application create a line of length equal to the required length 293 (FIG. 2D) in the X-axis. If there are multiple route segments at the junction 230, as shown by FIG. 7C the line does not overlap with any other backshell connected route segments. The application applies the RotationMatrix and TranslationMatrix to sketch segments points are inside backshell(s) 100 and applies the same transformation on route segment sketch segments points if the whole route segment is inside the backshell 100. The application creates the points resulting from the transformation to create flattened sketch segments, shown in FIG. 7C, where 3D segments as per the 3D design are attached to the flattened segment.

Figure 5:
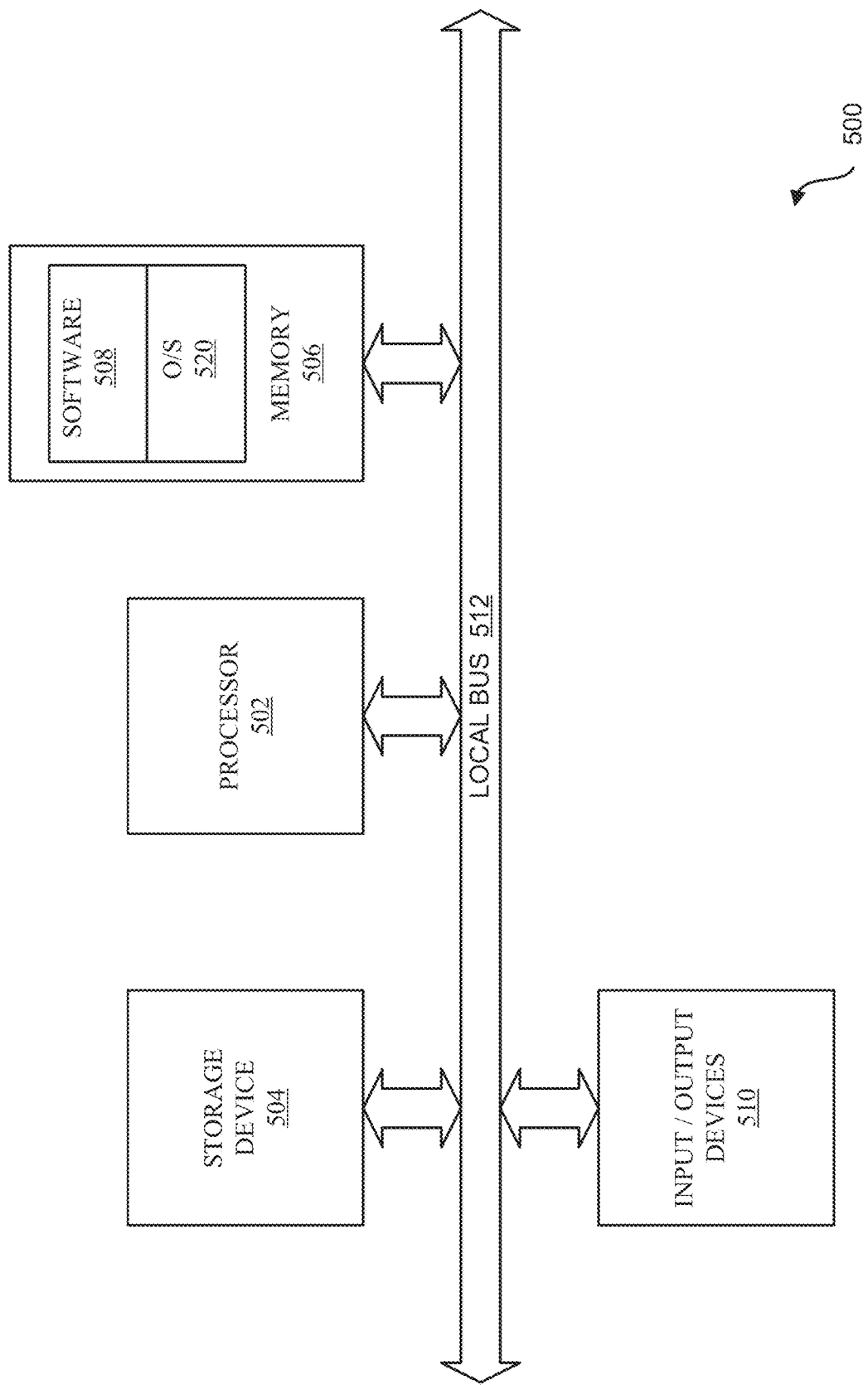
FIG. 5 is a schematic diagram illustrating an example of a system for executing functionality of the present invention.

The present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer based method for an application in a computer aided drafting (CAD) environment for flattening a three dimensional (3D) backshell component to a two dimensional (2D) representation while maintaining a connected wiring component represented in 3D, comprising steps of:
    identifying a 3D backshell component comprising a connector, a shell housing, and a connected first route segment comprising a curved route within the shell housing and at least a first sketch segment disposed within the backshell component and/or passing through a backshell component entry point;
    storing all sketch segments for the connected first route segment;
    identifying a first entry point at a first end point of the connected first route segment;
    computing a first tangent at the first entry point;
    computing a first junction point (J1) at a connected first route segment second end point using the first tangent and a required segment length;
    calculating a flattened route for all route segments unconnected to the backshell component;
    identifying a second junction point (J2) in flattened route;
    computing a second tangent at the second junction point;
    calculating a translation and rotation transformation aligning the first junction point to the second junction point, and aligning the first tangent and the second tangent;
    calculating a transformation matrix based on the translation and rotation transformation; and
    displaying in 2D the flattened unconnected route segment aligned with the 2D flattened backshell component maintaining the 3D orientation of the 3D route segment with the 3D backshell component,
    wherein the flattened unconnected route segment does not intersect the 3D backshell component displayed according to the 3D orientation of the 3D backshell component.

2. The method of claim 1, further comprising a step of applying a transformation to the stored sketch segment points to calculate transformed sketch segment points.

3. The method of claim 1, further comprising a step of identifying each route segment for the selected backshell connector.

4. The method of claim 1, wherein the backshell component is mated with a multi-CPoint connector.

5. The method of claim 1, wherein the backshell component is mated with single CPoint connector.

6. The method of claim 1, wherein the backshell component is attached at a first end of the route segment, and a second backshell is attached at a second end of the route segment.

7. The method of claim 1, further comprising a step of calculating a transformation to make a 3D plane of the backshell component parallel to viewing plane for a flattened representation.

8. A computer based method for an application in a computer aided drafting (CAD) environment for flattening a three dimensional (3D) backshell component to a two dimensional (2D) representation while maintaining a connected wiring component represented in 3D, comprising the steps of:
identifying a 3D backshell component comprising a connector, a shell housing, and a connected first route segment comprising a curved route within the shell housing and at least a first sketch segment disposed within the backshell component and/or passing through a backshell component entry point;
storing all sketch segments for the connected first route segment;
identifying a first entry point at a first end point of the connected first route segment;
computing a first tangent at the first entry point;
computing a first junction point (J1) at a connected first route segment second end point using the first tangent and a required segment length;
calculating a flattened route for all route segments unconnected to the backshell component;
identifying a second junction point (J2) in flattened route;
computing a second tangent at the second junction point;
calculating a translation and rotation transformation aligning the first junction point to the second junction point, and aligning the first tangent and the second tangent,
calculating a transformation matrix based on the translation and rotation transformation; and
displaying the flattened unconnected route segment aligned with the 3D backshell component;
applying a transformation to the stored sketch segment points to calculate transformed sketch segment points; and
calculating a first normal vector (N1) at the connector by taking a cross product between a connection point direction and a second direction between the first connection point and a second connection point, wherein a second normal vector (N2) is in a Z-direction normal to a connector surface plane, wherein the connector surface plane is referenced as the XY-plane,
wherein the flattened unconnected route segment does not intersect the 3D backshell component.

9. The method of claim 8, further comprising steps of:
calculating an N1/N2 transformation between the first normal vector N1 and the second normal vector N2; and
applying the N1/N2 transformation on the transformed sketch segment points aligning the connector parallel to the XY-plane.

10. The method of claim 9, further comprising a step of creating flattened sketch segments using calculated transformed sketch segment points and flattened route positions.

11. A computer based method for an application in a computer aided drafting (CAD) environment for flattening a three dimensional (3D) backshell component to a two dimensional (2D) representation while maintaining a connected wiring component represented in 3D, comprising steps of:
identifying a 3D backshell component comprising a connector, a shell housing, and a connected first route segment comprising a curved route within the shell housing and at least a first sketch segment disposed within the backshell component and/or passing through a backshell component entry point;
storing all sketch segments for the connected first route segment;
identifying a first entry point at a first end point of the connected first route segment;
computing a first tangent at the first entry point;
computing a first junction point (J1) at a connected first route segment second end point using the first tangent and a required segment length;
calculating a flattened route for all route segments unconnected to the backshell component;
identifying a second junction point (J2) in flattened route;
computing a second tangent at the second junction point;
calculating a translation and rotation transformation aligning the first junction point to the second junction point, and aligning the first tangent and the second tangent,
calculating a transformation matrix based on the translation and rotation transformation;
displaying the flattened unconnected route segment aligned with the 3D backshell component;
obtaining a 3D direction of a connection point within the backshell component;
determining a 2D direction of a connection point within the backshell component in the flattened representation;
determining a cross vector comprising a cross product between a 2D connection point direction and associated tangent at 2D junction point;
computing a viewing direction transformation based upon the cross vector and Z-axis; and
calculating a combined rotation matrix based upon the viewing direction,
wherein the flattened unconnected route segment does not intersect the 3D backshell component.

* * * * *